United States Patent [19]

Cohen et al.

[11]  4,294,080

[45]  Oct. 13, 1981

[54] DESORPTION STEP IN ABSORPTION HEAT PUMPS AND REFRIGERATORS

[75] Inventors: Georges Cohen, Le Pecq; Alexandre Rojey, Garches, both of France

[73] Assignee: Institut Francais du Petrole, Rueil-Malmaison, France

[21] Appl. No.: 102,489

[22] Filed: Dec. 11, 1979

[30] Foreign Application Priority Data

Dec. 11, 1978 [FR] France ............................... 78 35010

[51] Int. Cl.³ ............................................ F25B 15/00
[52] U.S. Cl. ...................................................... 62/101
[58] Field of Search ................................... 62/101, 107

[56] References Cited

U.S. PATENT DOCUMENTS 2,781,644  2/1957  Sapasnikov et al. .................. 62/101
4,127,009  11/1978  Phillips ................................. 62/101

Primary Examiner—Lloyd L. King
Attorney, Agent, or Firm—Millen & White

[57] ABSTRACT

An improvement to absorption heat pumps and refrigerators, which comprises supplying of a first fraction $S_1$ of a solution S subjected to a desorption step, to a heating and vaporization zone E where the solution $S_1$ is progressively heated and vaporized in a temperature interval $\Delta$ between an initial temperature $T_i$, and a final temperature $T_f$, by heat exchange with a fluid external to the desorption zone, while a vapor phase V' and optionally, a liquid phase L' are produced, which phases are separated from each other, and a second fraction $S_2$ of the solution S is fed to a desorption zone D in which the fraction $S_2$ and vapor phase V' are contacted to obtain a liquid phase L", phases L' and L" forming the phase L which is recycled to the absorption step.

18 Claims, 5 Drawing Figures

DESORPTION STEP IN ABSORPTION HEAT PUMPS AND REFRIGERATORS

BACKGROUND OF THE INVENTION

The object of the present invention is directed to an improvement in the running conditions of plants operated according to an absorption tri-thermal cycle. Such plants operate by delivering heat to an external medium in a temperature range A, by recovering heat from an external medium in a temperature range B, and by exchanging heat with an external medium in a temperature range C. Two cases are to be considered.

In the first case, hereinafter called case 1, the temperature range B is at least partly higher than the temperature range A and the device receives heat in the temperature range C, which is at least partly higher than the temperature ranges A and B: this device may operate either as refrigerator when the temperature range C is below room temperature, or as a heat pump when the temperature range C is at room temperature or above. In the first case a heat amount $Q_2$ is delivered in the temperature range A, which amount is greater than the heat amount $Q_1$ received in the temperature range B, while a heat amount $Q_2-Q_1$ is received in the temperature range C. In the second case, hereinafter called case 2, the temperature range B is at least partly below the temperature range A, and the system delivers heat in the temperature range C which is at least partly below the temperature ranges A and B: this is the case of the heat converter which is the object of the French Pat. No. 2,321,098. In case 2, a heat amount $Q_2$ is delivered in the temperature range A, which amount is smaller than the heat amount $Q_1$ received in the temperature range B, while a heat amount $Q_2-Q_1$ is released in the temperature range C.

In the following description, the term "absorption heat pump" will refer to any device receiving heat only above room temperature and complying with the above general definition, either in case 1 or in case 2.

In both cases 1 and 2, the cycle comprises at least one absorption step in which a gas phase of a working fluid, acting as solute, is contacted with a liquid phase used as solvent, and a desorption step in which the solution obtained in the absorption step is converted again to a liquid phase of low solute content and a gas phase of high solute content.

The desorption step is usually effected by feeding the solution S obtained in the absorption step into an enclosure heated by indirect contact exchange with an external fluid, while recovering a liquid phase L of low solute content and a vapor phase V of high solute content according to the device shown in FIG. 1a. When the solvent phase is itself volatile, it is usual in the absorption refrigerators to rectify the vapor phase V by condensing it at least partly, feeding back a part of the condensed liquid phase as reflux, and counter-currently contacting the vapor phase V with the reflux, for example in a plate column.

The stripping of the solvent phase by vapor V may be reduced by operating according to the arrangement represented in FIG. 1b. The solution S is supplied to the top of a counter-current contact zone and a vapor phase V' is generated at the bottom of this contact zone by vaporizing a part of the liquid phase L''' discharged from the bottom of said zone. The latter comprises, for example, plates, such as those commonly used for distillation or absorption. When contacting the solution S in that counter-current zone, the vapor increases its solute content and reduces its solvent content, while the solution decreases its solute content and increases its solvent content. The liquid phase L of decreased solute content is discharged from the vaporizer W. This problem is made clearly apparent when considering the desorption of an ammonia solution.

When operating according to the embodiment shown in FIG. 1a, at a pressure of 8 kg/cm² with a solution containing 50% b.w. of $NH_3$, the following evolution of the concentrations of liquid phase L and vapor phase V versus temperature is observed.

| Temperature °C. | 54.2 | 71.3 | 85.7 | 102.8 | 142.4 |
|---|---|---|---|---|---|
| $NH_3$ fraction in liquid phase b.w. | 0.5 | 0.4 | 0.33 | 0.25 | 0.09 |
| $NH_3$ fraction in vapor phase b.w. | 0.99 | 0.97 | 0.94 | 0.88 | 0.5 |

It is found that a temperature increase results in a liquid phase containing less and less ammonia, but the amount of water stripped in vapor phase quickly increases. At 142.4° C., the solution vaporizes entirely.

Conversely, when operating according to the arrangement shown in FIG. 1b, it is possible to maintain the vapor V evolved from the counter-current contact zone at a concentration close to the balance with the initial solution, i.e. 99% ammonia in fraction b.w. for a pressure of 8 kg/cm² and a solution containing 50% b.w. of $NH_3$, while obtaining a liquid phase L whose ammonia concentration corresponds to the heating temperature in the bottom of the counter-current zone, which provides for a thorough desorption. Such an arrangement is disclosed particularly in the above-mentioned French Patent.

However this arrangement requires the supply of the whole heat at a temperature close to the saturation temperature of the liquid phase L discharged from the counter-current contact zone, which temperature is the higher as the desorption is the more complete.

SUMMARY OF THE INVENTION

It has been found, and this is an object of this invention, that it is possible to maintain a high ammonia concentration in the liquid phase while supplying the necessary heat in a heat range which is considerably larger than in the case of the arrangement shown in FIG. 1b, which makes it possible to use waste heat for the heating of the plant in cases where this would have been impossible according to the embodiment of FIG. 1b.

DETAILED DISCUSSION OF THE INVENTION

Figures 1A, 1B, 1C:
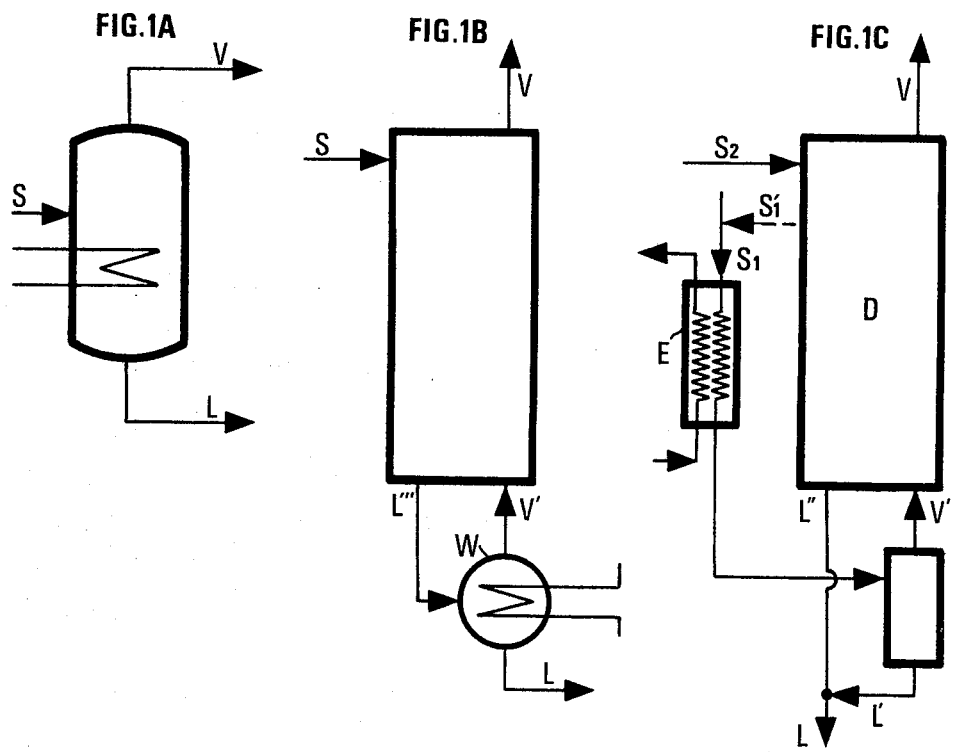
FIG. 1A is a schematic diagram of one embodiment of a prior art device desorption step for the stripping of a solvent phase by a vapor.
FIG. 1B is a schematic diagram of another prior art device of the type of FIG. 1A.
FIG. 1C is a schematic diagram of the desorption step of the device of the present invention for increasing the solute concentration of a vapor phase.

The improvement, according to the invention, to the desorption step of the absorption heat pumps and refrigerators, as illustrated in FIG. 1c, comprises the supply of a first fraction $S_1$ of the solution S subjected to the desorption step, to a heating and vaporization zone E where the solution $S_1$ is progressively heated and vaporized in a temperature interval $\Delta$ between an initial temperature $T_i$ and a final temperature $T_f$ by heat exchange with a fluid external to the desorption zone, while a vapor phase V' and optionally a liquid phase L' are produced, which phases are separated from each other, and a second fraction $S_2$ of the solution S is fed to a desorption zone D in which the fraction $S_2$ and the vapor phase V' are contacted to obtain a liquid phase L'', the phases L' and L'' forming the phase L which is recycled to the absorption step.

The solution $S_1$ may be completely vaporized (no L' is present); in that case, the whole phase L is collected at the outlet of the zone D.

Although it is preferred, as illustrated in FIG. 1c, that $S_1$ and $S_2$ be two fractions of identical composition of the solution S subjected to the desorption step, the whole solution S may be introduced in the upper part of the zone D ($S_2=S$) and the solution $S_1$ is formed by partial withdrawal of a liquid phase $S'_1$ at an intermediary level of the zone D ($S=S'_1$). The latter arrangement is however, in most of cases, less advantageous when the recovery is effected at a lower point of said zone D.

The solution subjected to the desorption step is usually formed of at least one part of the solution obtained in the absorption step, which does not mean that it cannot include other liquid fractions.

Thus, for example, when the vapor phase discharged from the desorption zone is condensed at a pressure close to the pressure in the desorption zone, optionally after admixture with a liquid fraction, and the resultant solution is partially vaporized at a pressure close to the pressure in the absorption zone to constitute the vapor phase which is supplied to the absorption zone, the residual liquid phase from said vaporization may be in part, or in totality, fed to the desorption zone to form a portion of the solution S.

By the term "fluid external to the desorption zone", it is intended to mean either a fluid external to the refrigerator or heat pump comprising the improved desorption stage of the invention and releasing heat, or a fluid circulated in another stage in the same refrigerator or heat pump, for example, in the absorption stage.

When the solution $S_1$ is fed at a temperature equal to or lower than its bubble point, it begins to vaporize at the bubble point. The vaporization range may be selected in relation with the inlet temperature of the external heating fluid. When this range widens, the vaporized fraction increases. The wider range corresponds to a complete vaporization, the final vaporization temperature being then the same as the dew point of the vapor having the same composition as the initial solution.

Thus, in the case of an ammonia solution containing 50% b.w. of $NH_3$ at a pressure of 8 kg/cm², the interval $\Delta$ will range from an initial temperature $T_i$ of 54.2° C. to a final temperature $T_f$ between 54.2° and 142.4° C.

It is thus possible to supply the necessary heat in a very broad temperature range, while in the case of the arrangement shown in FIG. 1b, in order to obtain a liquid phase and a vapor phase having compositions similar to those obtained by the process of the invention, the whole heat must be supplied at a temperature close to the temperature $T_f$.

The process of the invention may thus be used to upgrade heat available in a broad temperature range or again, to deliver heat in a larger average temperature range and with a reduced heat exchange surface.

When the desorption zone is operated at a pressure lower than the pressure in the absorption zone, the solution $S_1$ is expanded before passage through the heating zone E and if its temperature before expansion is higher than the bubble temperature after expansion, it is advantageous to sub-cool the solution $S_1$ before expansion, so as to have the widest possible vaporization range. The sub-cooling of the solution $S_2$ may be effected, for example, by heat exchange, before expansion, with an expanded and vaporized fraction of said solution. Such an arrangement is presented in example 2 illustrated by FIG. 3.

When operating according to the embodiment of FIG. 1c, it is possible to obtain a final vaporization temperature corresponding to the dew temperature of a vapor having the same composition as the initial solution. There results therefrom a level of solute concentration corresponding to the saturated liquid in equilibrium with said vapor, which represents the lower limit of the solute concentration in the phase L.

The above described modification of the step of desorption and heat exchange does not modify the other steps of the process and may be inserted in any absorption heat pump or refrigerator. In particular, the absorption step may be operated with the various modes of contact already known between the vapor phase forming the solute and the liquid phase forming the solvent, specially the mode of contact disclosed in the French Patent Application No. 7,828,170 of Sept. 29, 1978, consisting of counter-currently contacting the vapor phase forming the solute with a part of the liquid phase forming the solvent, the other part being admixed with the vapor phase discharged from the counter-current contact zone.

The main steps of the process corresponding to the arrangement represented in FIG. 1c, are thus preferably the following: (a) contacting in an absorption zone, a gas phase of solute with a liquid phase of solvent to obtain a solution S, (b) passing a first fraction $S_1$ of the solution S to a heating zone where it vaporizes at least partly by heat exchange with a fluid external to the desorption zone, (c) counter-currently contacting the vapor phase from step (b) with a second fraction $S_2$ of the solution S, (d) condensing the vapor phase from step (c) while supplying heat to an external fluid; (e) at least partly vaporizing the solution from step (d) while receiving heat from an external fluid; and (f) recycling the vapor phase from step (e) and the liquid phase from steps (b) and (c) to the absorption zone.

It is usually advantageous, in order to upgrade at the best the heat used to vaporize the solution $S_1$, to effect the corresponding heat exchange according to a mode of contact as close as possible to the counter-current.

The temperature levels of the external fluids at which the heat exchanges are effected differ in the above-cases 1 and 2.

In the case 1, the absorption step is effected at a pressure not exceeding the pressure in the desorption zone, while supplying heat to an external fluid in a temperature range A, and obtaining a solution S which is desorbed by receiving heat from an external fluid in a temperature range B and producing a vapor phase which is at least partly condensed at a pressure close to the pressure in the desorption zone while supplying heat to an external fluid in a temperature range A, revaporized at least partly at a pressure close to the pressure in the absorption zone while receiving heat from an external fluid in a temperature range C, and recycled to the absorption zone.

A preferred embodiment according to the present invention consists of:

(1) expanding and vaporizing at a first pressure level at least a part of the refrigeration fluid forming the solute, in an exchanger, recovering heat from an external fluid and exchanging heat between the vapor phase formed by said vaporized refrigeration fluid and the liquid phase formed by said refrigeration fluid before expanding, (2) absorbing this refrigeration fluid in a liquid phase formed of the impoverished solution discharged from the desorption zone, the heat of absorption being transmitted to an external fluid such as water or air in an exchanger, (3) pumping the so-obtained rich solution to bring it to a second level of pressure close to the pressure of the desorption zone, and exchanging heat between said rich solution and the impoverished solution discharged from the desorption zone, (4) dividing said rich solution into two fractions $S_1$ and $S_2$, and exchanging heat between the fraction $S_1$ and the impoverished solution recovered from the desorption zone, (5) vaporizing at least partly the fraction $S_1$ in an exchanger, and recovering heat from an external fluid, (6) feeding the so-obtained liquid-vapor mixture to the bottom of the desorption zone, (7) feeding the fraction $S_2$ to the desorption zone at a point in the desorption zone located above a stripping zone where the refrigerating fluid contained in dissolved state in the fraction $S_2$ is at least partly desorbed, by the vapor phase from the bottom of the desorption zone, by direct counter-current contact, (8) rectifying the vapor phase from said stripping zone, in a rectification zone located above the point of introduction of the fraction $S_2$, by direct counter-current contact of the vapor phase with a liquid reflux, (9) condensing the vapor phase from the rectification zone, and transmitting the condensation heat in an exchanger to an external fluid such as water or air,

(10) feeding back a part of the liquid phase thus obtained to step (8) as reflux, the remaining fraction being recycled to the step (1), and

(11) discharging from the desorption zone an impoverished solution and feeding it back to step (2).

In the case No. 2, the absorption step is effected at a pressure not below the pressure in the desorption zone by delivering heat to an external fluid in a temperature range A and obtaining a solution S which is desorbed by taking heat from an external fluid in a temperature range B, and producing a vapor phase, condensing it at least partly at a pressure close to the pressure in the desorption zone and transferring it to an external fluid in a temperature range C, re-vaporizing it at least partly at a pressure close to the pressure in the absorption zone by taking heat from an external fluid at a temperature level B, and recycling it to the absorption zone.

A preferred arrangement corresponding to case No. 2 consists of:

(1) condensing the vapor phase from a desorption zone in the presence of a fluid supply and transferring heat to an external fluid such as water or air in an exchanger at a first pressure level after having exchanged heat with the liquid phase from said exchanger, (2) pumping said liquid phase to bring it to a second pressure level close to the pressure of the absorption zone, (3) vaporizing at least partly said liquid phase by receiving heat from an external fluid after having exchanged heat as indicated in step (1), (4) separating the vapor phase from the liquid phase, (5) feeding a part of the liquid phase from step (4), after expansion, to step (1) as liquid supply to the vapor phase from the desorption zone, (6) admixing the remaining fraction with the rich solution from the absorption step, (7) pre-cooling the so-obtained mixture by heat exchange with a first fraction of said mixture, which fraction has been previously at least partly expanded and vaporized, as stated in step (8), (8) dividing the mixture from the step (7) into three fractions $F_1$, $F_2$ and $F_3$, the first fraction $F_1$ being vaporized to effect the pre-cooling as described in step (7), the resultant liquid vapor mixture being supplied to the bottom of the desorption zone, the second fraction $F_2$ forming the fraction $S_2$ which is expanded and supplied to the top of the desorption zone, and the third fraction $F_3$ forming the fraction $S_1$ which is expanded and vaporized at least partly by receiving heat from an external fluid, the resultant liquid vapor mixture being supplied to the bottom of the desorption zone, (9) directly counter-currently contacting the liquid phase with the vapor phase in the desorption zone, and recovering an impoverished solution from the bottom of the desorption zone,

(10) effecting an absorption step by contacting the impoverished solution from step (9) with the vapor phase from step (4) and obtaining a rich solution, and

(11) recycling the rich solution from step (10) to step (6).

The absorption step may be effected by directly admixing the vapor phase from step (4) with the impoverished solution from step (9) and delivering the absorption heat to an external fluid such as water or air. It is also possible to effect this absorption step by counter-current contact of a first fraction of the liquid phase resulting from the desorption step with the vapor phase discharged from the desorption step, by admixing the vapor phase resulting from said counter-current contact with a second fraction of said liquid phase, condensing the resultant liquid-vapor mixture and delivering heat to an external fluid during the condensation of the said mixture.

It is clear that each of the above heat exchanges may be effected in one or several steps, each exchange being effected with only one external fluid or with several fluids. The heat exchanges may also be effected at several temperature levels in the same temperature range. For example, in cases 1 and 2, the two exchanges effected in the range B are not necessarily performed at the same temperatures.

In some cases, for example, in certain cases of cold production, it is necessary to have available, at the outlet of the desorption zone, a vapor phase of the practically pure constituent forming the solute of the absorption step. In that case, it is necessary to provide a rectification zone above the desorption zone, the rectification being effected by counter-current contact, for example, in a plate column, of the vapor phase discharged from the desorption zone with a part of the liquid phase resulting from the condensation of the vapor discharged from said rectification zone.

The invention particularly applies in the case where the solute is ammonia and the solvent is water. However other solutes and other solvents may be used either pure or as mixtures.

The solvent may also be an organic solvent such as dimethyl formamide, dimethyl sulfoxide, N-methyl pyrrolidone, tetraethylene glycol dimethyl ether, tributyl phosphate, ethylene glycol, diethylene glycol, benzyl alcohol, aniline or a hydrocarbon selected, for example, from the paraffinic hydrocarbons.

The solute, whose boiling or sublimation temperature is lower than that of the solvent, may be ammonia, a hydrocarbon, such as propane, butane, pentane, or a halogenated hydrocarbon such as difluorochloromethane, fluorodichloromethane or difluorodichloromethane, provided it is soluble in the solvent, said dissolution taking place with heat release.

As a rule, any solute/solvent pair may be used, provided the materials are chemically stable and the solute and the solvent may be vaporized individually or as mixtures in the operating conditions of temperature and pressure, the solute being more volatile than the solvent, and provided the solute dissolves in the solvent with heat release.

The pressure in the desorption zone is preferably from 1 to 20 bars.

The fraction $S_1$ of the solution represents advantageously 10 to 90% and preferably 10 to 70% of the solution S, the remainder constituting the fraction $S_2$.

The temperature of the fluid external to the desorption zone, which supplies the heat necessary for the vaporization of the solution $S_1$, is selected in a temperature range from 0° to 200° C., preferably from 50° to 150° C.

The absorption and desorption steps are preferably conducted in columns of the type commonly used in chemical engineering to carry out operations of this type, although other devices, particularly those including mechanical stirring, may be used.

The admixture of a gas phase with a liquid phase may be performed either by mere admixture in line, or in an enclosure with mechanical stirring, or in a contact zone of the flow type, of the plate type or of the packing type. Said admixing and the release of heat by at least partial condensation of the said mixture may be effected either successively, the admixing zone being distinct from the exchanger where heat is delivered to the exterior, or simultaneously, for example, by admixing in a drum provided with a cooling exchanger.

Figure 2:
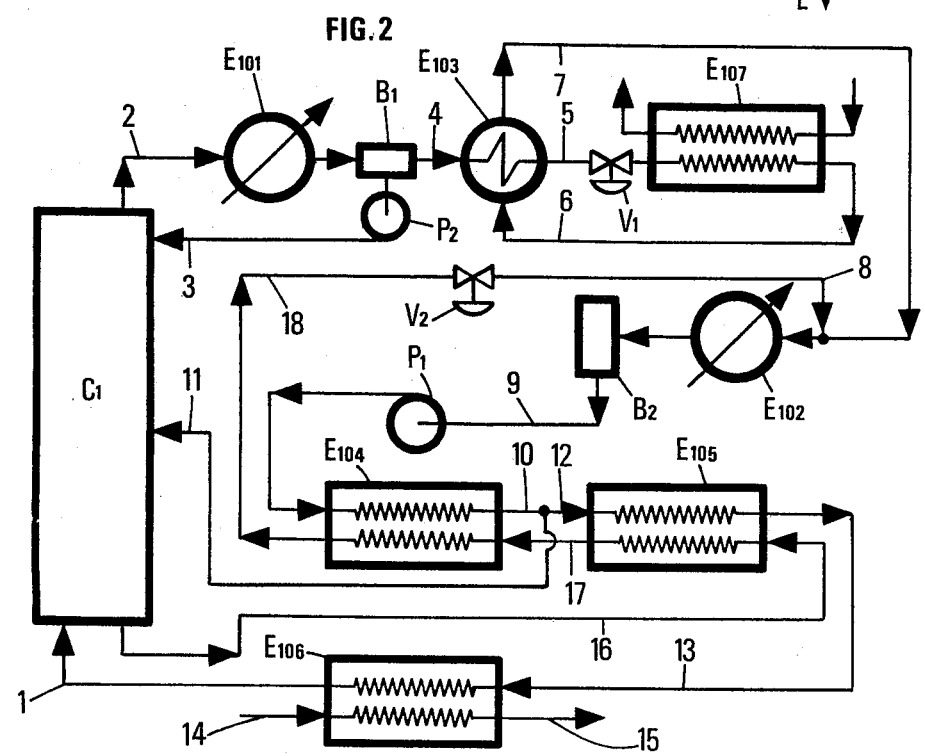
FIG. 2 is one embodiment of the entire system of the present invention.
Figure 3:
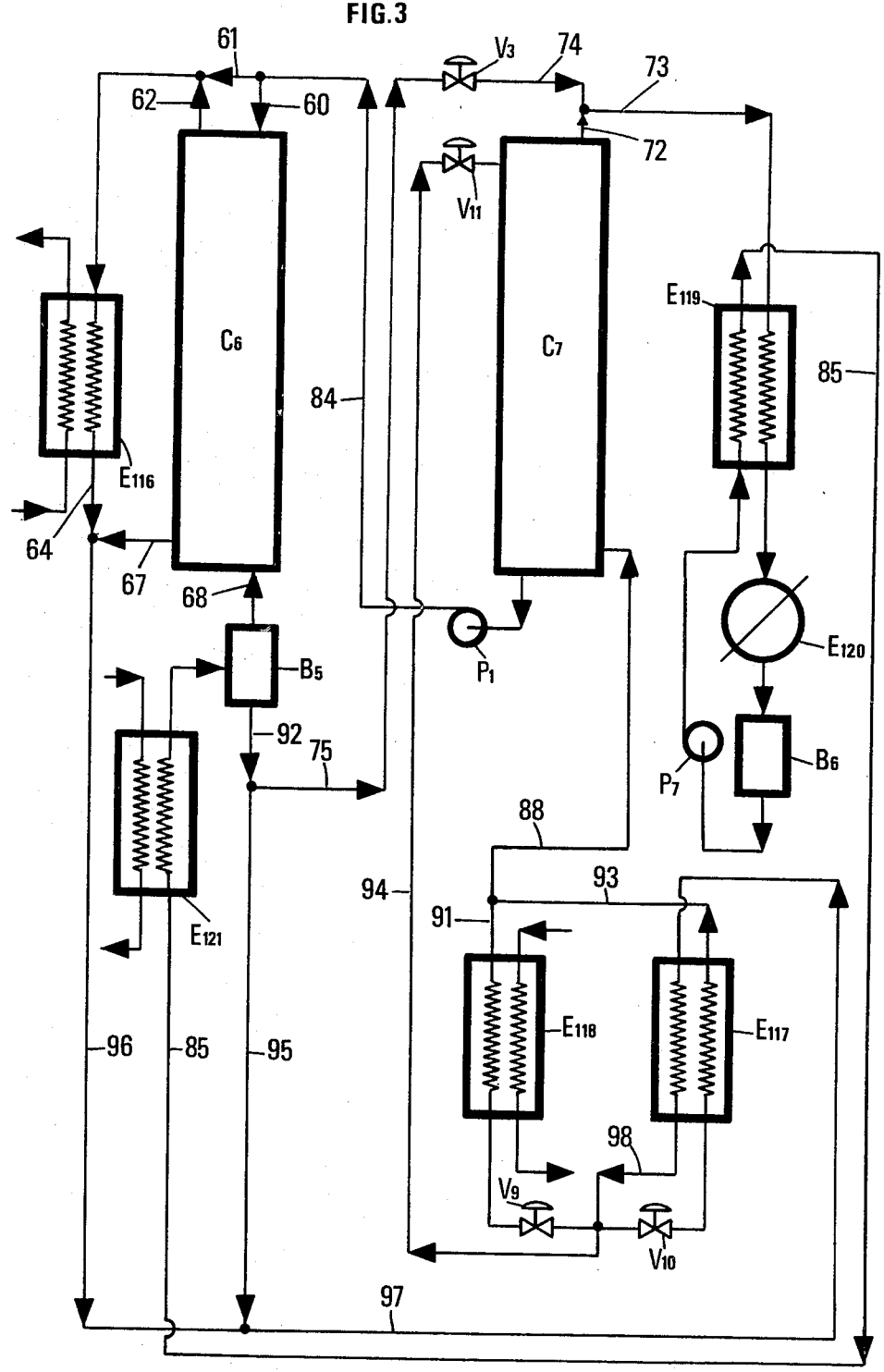
FIG. 3 is another embodiment of the entire system of the present invention.

Embodiments of the invention are illustrated by the FIGS. 2 and 3. The examples 1 and 2 illustrate the invention. To simplify, the FIGS. 2 and 3 are described in relation with the examples 1 and 2; however they have a wider scope and they are not to be interpreted as limited to the values given in said examples.

EXAMPLE 1

This example is illustrated by the FIG. 2. The device is of the type belonging to the above case 1.

9 T/h of a liquid-vapor mixture, whose composition by weight is:

$NH_3$: 47%
$H_2O$: 53% is fed through duct 1 to the plate column C1. The liquid fraction and the vapor fraction, the latter amounting to 4.2 T/h, separate in the bottom of column C1. The liquid fraction is admixed with the liquid discharged from the first plate above the bottom of the column and the vapor fraction is supplied to the plates.

The column C1 comprises 11 plates and is operated at a top pressure of 14 kg/cm².

Ammonia vapor of a purity higher than 99% is collected at the top; it is condensed in the exchanger E 101 by cooling, with cooling water, down to a temperature of 35° C. (in the temperature range A of the general definition). $1.16 \times 10^6$ Kcal/h evolve in exchanger E 101.

The condensate is recovered in the drum B1; an amount of condensate representing 10% of the condensate collected at the outlet of exchanger E 101 is fed back through the pump P2 and the duct 3, as reflux, to the column $C_1$. The remainder fraction is fed through the duct 4 to the exchanger E 103; it is discharged therefrom through the duct 5. It is then expanded through the valve $V_1$ to a pressure of 4 kg/cm² and vaporizes in the exchanger E 107 at a temperature of $-3°$ C., while cooling an external fluid in the temperature range C of the general definition. $1 \times 10^6$ Kcal/h thus evolve. The ammonia vapor is fed through the duct 6 to the exchanger E 103 and is discharged therefrom through the duct 7.

This vapor is admixed with the solution fed through the duct 8, thus yielding a mixture of water and ammonia containing 47% by weight of ammonia. This mixture is condensed in the exchanger E 102 by cooling to 35° C. with cooling water in the temperature range A of the general definition.

The resultant solution is discharged from the exchanger E 102 through the duct 9; it is collected in the drum B2 and fed through the pump P1 to the exchanger E 104 from which it issues in the liquid state through the duct 10 at a temperature of 80° C. 9.45 T/h thereof is fed through the duct 11 to the column C1 above the fifth plate from the bottom. The remainder is fed through the duct 12 to the exchanger E 105 from which it issues through the duct 13 at a temperature of 100° C. It is then supplied to the exchanger E 106 where it progressively vaporizes between 100° and 140° C. while recovering heat from an external fluid fed at 150° C. through the duct 14 and discharged at 110° C. through the duct 15 (temperature range B of the general definition). The device thus receives $1.6 \times 10^6$ Kcal/h. A liquid phase containing 23% b.w. of $NH_3$ is recovered at the bottom of the column C1; it is supplied through the duct 16 to the exchanger E 105 from which it is discharged through the duct 17; it is passed to the exchanger E 104 and then, through the duct 18, to the expansion valve V2.

EXAMPLE 2

This example is illustrated by FIG. 3. The device operates according to the above-mentioned case 2.

The column C6 is fed through the duct 68 with 5.75 T/h of a vapor stream whose composition is as follows in % by weight.

$NH_3$: 80%
$H_2O$: 20%

The column C6 has 6 plates and is operated at a top pressure of 20 kg/cm². The vapor phase admitted through the duct 68 is contacted in the column C6 with a 4% b.w. ammonia solution fed through the duct 60.

A vapor phase is collected in the duct 62; it is admixed with 7.03 T/h (duct 61) of material whose composition is that of the liquid phase fed through the duct 60. The liquid vapor mixture is fed to the exchanger E 116 where it condenses and releases $2.04 \times 10^6$ Kcal/h to a water stream which vaporizes at 150° C. (temperature range A of the general definition).

The mixture of water and ammonia is discharged in the condensed state from the exchanger E 116 through the duct 64 and the resultant solution is admixed with the solution discharged from the column C6 through the duct 67. The mixture of the two solutions is passed in the duct 96; it is admixed with a liquid stream of 1.1 T/h (duct 95) from the drum B5. The resultant solution is fed through the duct 97 to the exchanger E 117.

In the exchanger E 117, the solution fed through the duct 97 is cooled from 155° to 115° C. by exchange with a stream of 4.15 T/h taken from the solution discharged from the exchanger E 117, through the duct 98, expanded through the valve $V_{10}$ and partially vaporized between 105° and 145° C.

The fraction of the solution supplied through the duct 98, which is not fed to the exchanger E 117, is passed through the valve $V_9$ and partially vaporized in the exchanger E 118 from 105° to 145° C. $2.403 \times 10^6$ Kcal/h is thus received from an external fluid fed at 160° C. and discharged at 119° C. (temperature range B of the general definition). This external fluid is an oil cut from a distillation column. The liquid vapor mixture discharged from the exchanger E 118 through the duct 91 is admixed with the liquid vapor mixture discharged from the exchanger E 117 through the duct 93 and the resultant liquid vapor mixture is supplied through the duct 88 to the column C7. In the bottom of the column C7 the liquid fraction and the vapor fraction separate. The vapor fraction is contacted with the liquid phase supplied from the duct 94 and expanded through the valve $V_{11}$. The column C7 has 12 plates and operates at a top pressure of 6 atm. The top vapor discharged through the duct 72 is admixed with the solution supplied through the duct 74, and the liquid vapor mixture is fed through the duct 73 to the exchanger E 119. At the outlet of the exchanger E 119, the liquid vapor mixture is fed to the condenser E 120 where it is cooled to 30° C. by means of a water stream (temperature range C of the general definition). The resultant solution contains 55% b.w. of ammonia. It is collected in the drum B6 and supplied through the pump P7 to the exchanger E 119; it is discharged at a temperature of 105° C. and fed through the duct 85 to the exchanger E 121, where it progressively vaporizes up to 145° C. $1.604 \times 10^6$ Kcal is received from an external fluid which is a second oil cut from the same distillation column as that providing the oil cut fed to the exchanger E 118. This external fluid is supplied at 160° C. and discharged at 116° C. (temperature range B of the general definition). The liquid vapor mixture discharged from the exchanger E 121 is collected in the drum B5. The liquid phase is discharged through the duct 92. It is separated into two fractions discharged through the ducts 95 and 75.

As made apparent in this example, the solution supplied to the desorption step may be divided into more than 2 fractions, necessarily comprising S1 and S2. Thus a fraction of the solution fed to the desorption step, distinct from S1 and S2, may be vaporized separately (E 117) in order to cool said solution.

What is claimed is:

1. An improved process for operating an absorption heat pump or an absorption refrigerator, the improvement comprising the steps of:
    (a) directly contacting a solute vapor phase (V″) with a liquid phase (L′) and a liquid phase (L″) in an absorption zone, the liquid phases (L′) and (L″) being solvents for the solute vapor phase (V″), thereby recovering a solution (S);
    (b) dividing the recovered solution (S) into a first portion ($S_1$) and a second portion ($S_2$), supplying said first portion ($S_1$) of the solution (S) to an indirect contact heat exchange zone and indirectly contacting said portion ($S_1$) with an external heating fluid in said indirect contact heat exchange zone, thereby recovering a vapor phase (V′), and a residual liquid phase (L′), separating said vapor phase (V′) from said residual liquid phase (L′) and feeding back said liquid phase (L′) to step (a);
    (c) directly contacting, in counter-current contact, the vapor phase (V′) from step (b) with said second portion ($S_2$) of the solution (S) in a desorption zone, thereby recovering separately a vapor phase (V) and a liquid phase (L″) and feeding back said liquid phase (L″) to step (a);
    (d) passing the vapor phase (V) from step (c) through a condensation zone, externally cooling the vapor phase (V) in said condensation zone with an external cooling fluid and recovering a condensed phase (C); and
    (e) passing said condensed phase (C) through an evaporation zone, externally heating said evaporation zone with an external heating fluid to vaporize at least a portion of said condensed phase (C), recovering a vapor phase (V″) therefrom, and feeding back said vapor phase (V″) to step (a).

2. A process according to claim 1 wherein the external heating fluid is a heat source external to the heat pump or the refrigerator.

3. A process according to claim 1, wherein the portion $S_1$ of the solution S is vaporized by counter-current heat exchange with the external fluid of step b.

4. A process according to claim 1, wherein the solute is ammonia and the solvent is water.

5. A process according to claim 1, wherein the solute is a hydrocarbon and the solvent is dimethyl formamide, dimethyl sulfoxide, N-methyl pyrrolidone, tetraethylene glycol dimethyl ether, tributyl phosphate, ethylene glycol, diethylene glycol, benzyl alcohol, aniline or a hydrocarbon.

6. A process according to claim 1, wherein the solute is a halogenated hydrocarbon and the solvent is dimethyl formamide, dimethyl sulfoxide, N-methyl pyrrolidone, tetraethylene glycol dimethyl ether, tributyl phosphate, ethylene glycol, diethylene glycol, benzyl alcohol, aniline, or a hydrocarbon.

7. A process according to claim 1, wherein the fraction $S_1$ of the solution S represents 10 to 90% of the solution S, the remainder constituting the fraction $S_2$.

8. A process according to one of the claims 1, wherein the pressure in the desorption zone of step (c) is 1 to 20 bars.

9. A process according to claim 1, wherein the temperature of the external heating fluid of step (b) is selected in the range of from 0° C. to 200° C.

10. A process according to claim 1, wherein the pressure maintained in the absorption zone in step (a) is at most equal to the pressure in the desorption zone in step (c), the pressure in the condensation zone in step (d) is substantially the same as in the desorption zone in step (c), and the pressure in the evaporation zone in step (e) is substantially the same as in the absorption zone in step (a).

11. A process according to claim 1, further comprising the steps of counter-currently contacting a portion of the condensed phase (C) from step (d), with the vapor phase (V) from step (c), thereby rectifying said vapor phase (V), and thereafter feeding resultant rectified vapor phase (V) to step (d) as said vapor phase (V), and feeding a resultant wash liquid phase to step (c) to contact said vapor phase (V').

12. A process according to claim 1, wherein the pressure in the absorption zone in step (a) is at least equal to the pressure in the desorption zone in step (c), the pressure in the condensation zone in step (d) is substantially the same as in the desorption zone in step (c) and the pressure in the evaporation zone in step (e) is substantially the same as in the absorption zone in step (a).

13. A process according to claim 1, further comprising the steps of: (f) discharging a residual unabsorbed vapor phase (V''') from the absorption zone of step (a); (g) admixing said vapor phase (V''') with a portion of at least one of the liquid phases (L') and (L''); passing the resultant mixture through a cooling zone; cooling said resultant mixture with an external heat-receiving fluid, thereby recovering a cooled liquid phase; and admixing said cooled liquid phase with the solution (S).

14. A process according to claim 1, further comprising the steps of counter-currently contacting the solution (S) recovered in step (a) with the vapor phase (V) recovered in step (c) before dividing said solution (S) into said first portion ($S_1$) and said second portion ($S_2$), and feeding a resultant contacted vapor phase to step (d) as said vapor phase (V).

15. In a process for operating an absorption heat pump or an absorption refrigerator, the process comprising essentially a cycle and including at least one absorption step in which a gas phase of a working fluid, acting as a solute, is contacted with a liquid phase used as solvent, and a desorption step in which the solution obtained in the absorption step is converted again to a liquid phase of low solute content and a gas phase of high solute content, an improvement to the desorption step comprising the steps of:

supplying a first fraction $S_1$ of a solution S, said solution having been obtained from the absorber and to be subjected to desorption, to a heating and vaporization zone;

progressively heating said first fraction $S_1$, between an initial temperature $T_i$ and a final temperature $T_f$ by heat exchange with a fluid external to said vaporization zone, to produce a vapor phase V';

feeding a second fraction $S_2$ of said solution S to the desorption zone; contacting said vapor phase V' and said second fraction $S_2$ in counter-current contact in said desorption zone to obtain a liquid phase L'' which is collected at the outlet of said desorption zone for recycling to the absorption step.

16. An improved process as in claim 15 further comprising producing a liquid phase L' in said progressively heating step and separating said liquid phase L' from said vapor phase V'.

17. An improved process as in claim 16 further comprising joining said liquid phase L' with said liquid phase L'' to produce a liquid phase L which is then recycled to the absorption step.

18. An improved process as in claim 15 further comprising recovering additional solution $S_1$ resulting from said contacting of said vapor phase V' and said second fraction $S_2$ in said desorption zone, and joining said additional solution $S_1$ with said solution first fraction $S_1$ before said progressive heating.

* * * * *